(12) United States Patent
Dinkelman

(10) Patent No.: US 6,168,661 B1
(45) Date of Patent: Jan. 2, 2001

(54) BATTERY CELL COATING APPARATUS AND METHOD

(75) Inventor: John P. Dinkelman, South Milwaukee, WI (US)

(73) Assignee: Johnson Controls Technology Company, Plymouth, MI (US)

( * ) Notice: Under 35 U.S.C. 154(b), the term of this patent shall be extended for 0 days.

(21) Appl. No.: 09/177,757

(22) Filed: Oct. 23, 1998

Related U.S. Application Data

(60) Provisional application No. 60/081,400, filed on Apr. 10, 1998.

(51) Int. Cl.[7] .................................................. B05C 1/00
(52) U.S. Cl. .............................. 118/245; 118/261
(58) Field of Search ..................... 118/244, 211, 118/212, 249, 262, 261, 245; 366/287, 42, 325.4

(56) References Cited

U.S. PATENT DOCUMENTS

| | | | |
|---|---|---|---|
| 1,822,466 | * | 9/1931 | Valdes ................................. 118/262 |
| 2,245,513 | * | 6/1941 | Weicker .............................. 118/261 |
| 2,766,721 | | 10/1956 | Paquette ............................. 118/405 |
| 2,926,628 | * | 3/1960 | Black ............................... 118/262 X |
| 3,690,910 | | 9/1972 | Mahe et al. ............................. 117/7 |
| 4,111,155 | | 9/1978 | Klein et al. .......................... 118/642 |
| 4,745,429 | * | 5/1988 | Mukai et al. ..................... 118/261 X |
| 5,128,716 | * | 7/1992 | Kifa ................................. 118/261 X |
| 5,412,458 | * | 5/1995 | Kamaji et al. ................... 118/261 X |
| 5,633,045 | * | 5/1997 | Smith et al. ..................... 118/261 X |

FOREIGN PATENT DOCUMENTS

| | | | |
|---|---|---|---|
| 1546850B | 5/1970 | (DE) . | |
| 0639865 | 2/1995 | (EP) | ............................... H01M/4/04 |
| 0661104 | 7/1995 | (EP) | ............................... B05D/1/26 |
| 82046389 | 9/1980 | (JP) . | |
| 57-46389 | 3/1982 | (JP) | ............................... G11C/11/34 |
| 05205738 | 11/1993 | (JP) | ............................... H01M/4/30 |
| WO9818170 | 4/1998 | (WO) | ............................. H01M/4/04 |

OTHER PUBLICATIONS

Shinjiro Murakami et al., "Kawasaki Steel's Multipurpose Coating Line", *Iron And Steel Engineer*, pp. 36–41, vol. 70, No. 7, Jul. 1, 1994.

George L. Booth, "Coating Rods, Equipment, Processes And Applications", *Coating Equipment And Processes*, Lockwood 1970.

Donald M. MacLeod, "An Introduction to Wire–Wound Rod Coating", Industry Tech.

\* cited by examiner

*Primary Examiner*—Kevin Weldon
(74) *Attorney, Agent, or Firm*—Quarles & Brady LLP

(57) ABSTRACT

The invention relates to a method and apparatus for coating both sides of a thin metal strip with electrochemically active material by the use of coating rod mechanism acting on a single side of the metal strip. The method is preferably carried out by applying the coating to one face of the strip drawn from the supply roll, changing the orientation of the strip, coating the opposite side of the strip and drying the coated sides. The dried and coated strip may be wound up on a take up reel. In the preferred embodiment, the strip from the feed roll first passes a web guide which reverses the direction of travel of the strip before the first side is coated. The strip then passes around a second web guide which again reverses the strip direction of travel before the second side of the strip is coated and the coated strip is dried.

23 Claims, 4 Drawing Sheets

BATTERY CELL COATING APPARATUS AND METHOD

CROSS REFERENCES TO RELATED APPLICATIONS

This application claims the benefit of U.S. Provisional Patent Application No. 60/081,400 filed on Apr. 10, 1998.

STATEMENT REGARDING FEDERALLY SPONSORED RESEARCH

Not Applicable.

BACKGROUND OF THE INVENTION

The field of invention is electrochemical batteries, more particularly, a method and apparatus for applying an electrochemically active material onto an ultra-thin metal film for use in electrochemical batteries.

Developments in the field of electrochemical batteries have produced batteries having electrochemical cells that have both excellent charge and discharge characteristics. These cells require ultra-thin films of a metal such as lead, nickel or metal alloys having a thickness of 2–5 mils coated with extremely thin layers of an electrochemically active material, having a thickness of approximately 1–5 mils.

A typical electrochemical cell, as shown in FIGS. 2 and 3, includes an ultra-thin strip 2 of lead alloy of approximately 2 inches in width and 2–5 mils thick. The electrochemically active material 3 is a compound that includes lead monoxide, sodium sulfate and other inactive materials. The compound 3 is applied to the top and bottom surfaces of the metal strip 2, coating the entire width of the strip 2 except for an uncoated strip edge 4 approximately 0.2 inches wide on both surfaces of the strip to provide an uncoated electrical connection surface.

Methods have been developed to produce lead and other suitable metals and alloys in the form of an ultra-thin film that is suitable for use in these electrochemical cells. The use of these ultra-thin strips is disclosed in U.S. Pat. No. 5,677,078.

The electrochemically active material can be applied to the metal strip in a fluid form and then dried to produce a solid coating. Various means and methods to coat the ultra-thin metal films have proved less than satisfactory. One particular method sprays the aqueous solution onto the sides of the metal films. Due to environmental hazards that exist with spraying a solution containing metals such as lead, this method is unacceptable for use.

Other methods coat a side of the thin film using a roller apparatus that applies the fluid solution to a film that is supported by a backing roller to prevent the ultra-thin film from breaking. The use of a backing roller only allows coating a single side of the film at a time with an intermediate drying step, thus lengthening the time necessary to manufacture the electrochemical cell. The use of a coating roller also does not typically provide a clean edge that is suitable for an electrical connection without masking the edge at the point of application or a subsequent step of wiping.

A method used to coat both sides of a thin film simultaneously is to dip the entire film in the aqueous solution. This particular method does not provide an uncoated edge without a subsequent step of wiping or other method to remove some of the coated material. Additionally, this particular method requires that the same coating material is applied to both sides of the film, which is unacceptable for certain applications, such as in use with bi-polar batteries.

Providing a clean edge for an electrical connection is important to ensure the performance of the assembled battery. The steps described above such as wiping and masking have proven unacceptable for various reasons. Wiping does not always completely remove the coated material leaving a residue that affects the battery performance. Additionally, the thin film has a low tensile strength that is subject to tearing during the wiping process.

Masking is a process of covering the area that is not to be coated during the coating process. Typically, a roller covers the edge as the remaining portion of the strip is coated. This roller tends to become fouled, that is coating material can be splattered on the masking roller which is then transferred to the edge that should be left clean, thus reducing the battery performance.

BRIEF SUMMARY OF THE INVENTION

In one of its aspects, the invention relates to a method and apparatus for coating both sides of a thin metal strip with electrochemically active material by the use of coating rod mechanism acting on a single side of the metal strip. The method is preferably carried out by applying the coating to one face of the strip drawn from the supply roll, reversing the direction of travel of the strip coating the opposite side of the strip and drying the coated sides. The dried and coated strip may be wound up on a take up reel.

In the preferred embodiment, the strip from the feed roll first passes a web guide which reverses the direction of travel of the strip before the first side is coated. The strip then passes around a second web guide which again reverses the strip direction of travel before the second side of the strip is coated and the coated strip is dried. The web guides, supply reel, and take-up reel controls the speed and tension in the strip so that back up rolls are not needed at the coating mechanisms.

The invention also resides in a coating mechanism that includes a reservoir, a mixing rod relating through fluid coating material in the reservoir, and a coating rod receiving coating material from the mixing rod and applying the coating material to the strip. The mixing rod is longitudinally grooved and the coating rod is circumferentially grooved.

DESCRIPTION OF THE PREFERRED EMBODIMENTS

Figure 1:
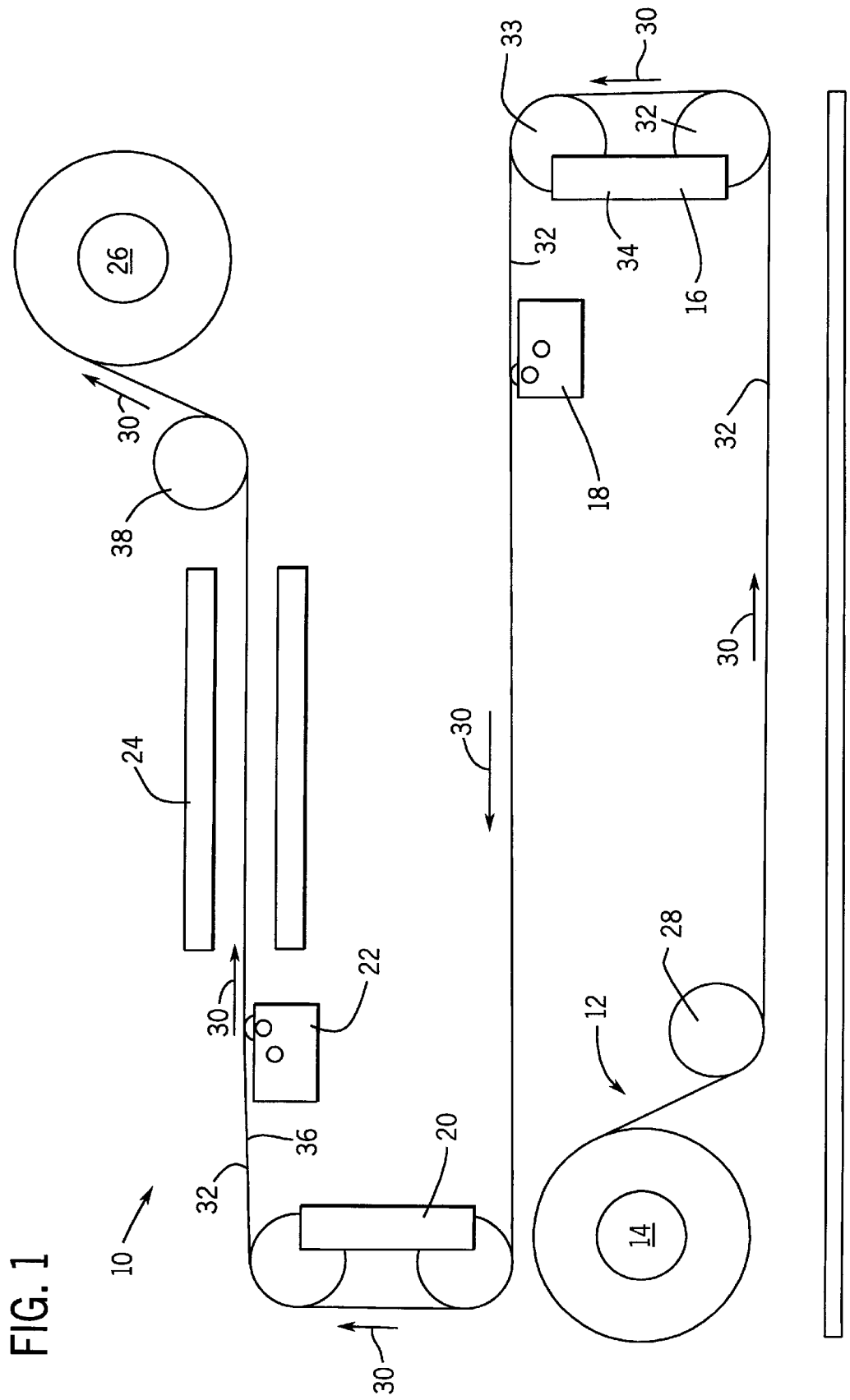
FIG. 1 is a schematic view of a ultra-thin strip coating apparatus incorporating the present invention.
Figure 2:
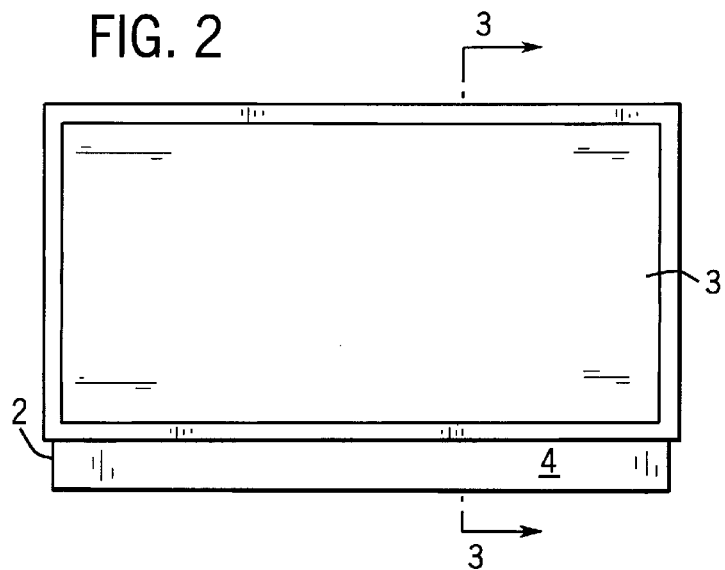
FIG. 2 is a plan view of a portion of a coated ultra-thin strip that can be produced by the apparatus of FIG. 1.
Figure 3:
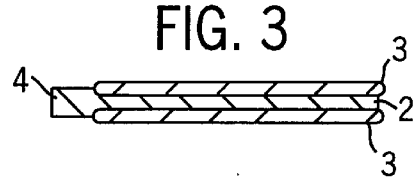
FIG. 3 is a cross sectional view of the strip in FIG. 2.

Referring to FIG. 1, an embodiment of the present invention is a coating method and apparatus 10 that coats both sides of a thin strip 12 of lead foil with a thin layer of electrochemically active paste having a density of approximately 3.5–4 grams/cm$^3$ for use in batteries, such as described in U.S. Pat. Nos. 5,047,300 and 5,677,078 which are incorporated herein by reference. The coating apparatus 10 includes a foil supply reel 14, a first web guide assembly 16, a first coating mechanism 18, a second web guide assembly 20, a second coating mechanism 22, a drying assembly 24, and a take up reel 26. The entire apparatus is mounted on a side of a vertical base (not shown).

As shown in FIG. 1, the supply reel 14 has a thin lead foil strip 12 wound thereon and is rotably mounted to the vertical base. The thin lead foil 12 unwinds from the supply reel 14 and travels underneath an idler roller 28 that helps maintain a constant tension in the foil strip 12 in cooperation with the supply reel 14 and the first web guide assembly 16.

The first web guide assembly 16 is disposed along a foil strip path 30 and changes the foil strip 12 orientation by reversing the foil strip direction of travel, exposing a downwardly facing first side 32 of the strip 12 to the first coating mechanism 18. The web guide assembly 16, such as an AccuGlide II Model 060802 narrow web guide assembly available from AccuWeb, Inc., Madison, Wis., has a pair of cork-wrapped rollers 32 and 33 ratably mounted between a pair of opposing sidewalls 34, one roller 33 being disposed above the other 32. The sidewalls 34 are rigidly mounted to a bracket (not shown) which is mounted to the apparatus base (not shown) by bolts or other methods known in the art.

The foil strip 12 having an upwardly facing first side engages the web guide lower roller 32 and changes direction upwardly 90 degrees to engage the upper roller 33 which changes the foil direction rearwardly 90 degrees, thus reversing the original travel direction of the foil 12 and facing the foil first side 32 downwardly. The web guide dual roller assembly 16 prevents over bending of the foil 12 causing breakage.

The first web guide assembly 16 also accurately guides the foil strip 12 over the first coating assembly 18 using a microprocessor controlled web guide control system (not shown), such as an AccuGuide III Micro 1000 microprocessor-pulsed compensated ultrasonic web guide control system available from AccuWeb, Inc. of Madison, Wis. The control system receives inputs from an ultrasonic edge detector (not shown) that is part of the web guide control system and assembly as provided by AccuWeb, Inc., to determine the foil edge and shifts the rollers 32 and 33 using actuators in the desired direction to properly align the foil 12 above the coating mechanism 18, with respect to the detected edge. Other methods known in the art may be used to guide the foil without departing from the present invention.

The first coating mechanism 18 is disposed along the foil path 30 following the first web guide assembly 16 and coats the downwardly facing side 32 of the foil 12 with an electrochemically active solution. The coating mechanism 18 coats the foil strip 12 using a method and apparatus not previously known in the art to provide a consistent coating thickness having well defined coating edges that terminate inward from the foil edges. Although the coating mechanism 18 is novel as described herein, any coating apparatus or method that can coat a foil strip 12, such as used to coat a single side of a strip, may be used without deviating from the intent of the present invention.

Figure 4:
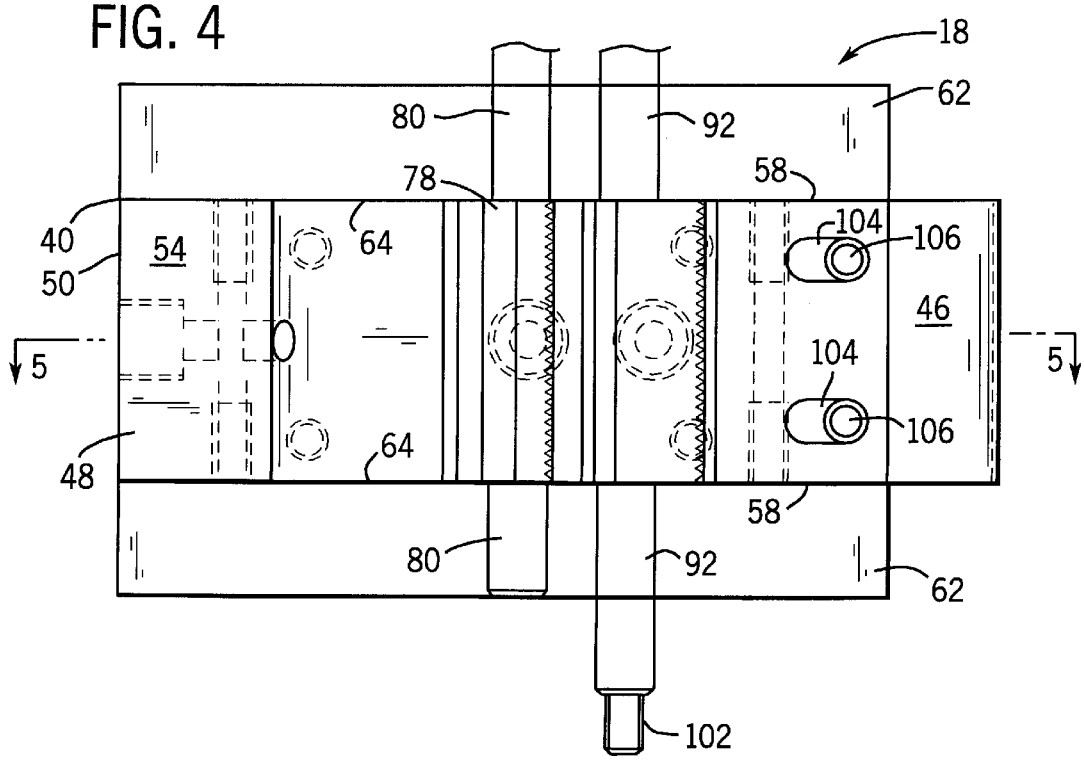
FIG. 4 is a plan view of a coating mechanism of the apparatus of FIG. 1.
Figure 5:
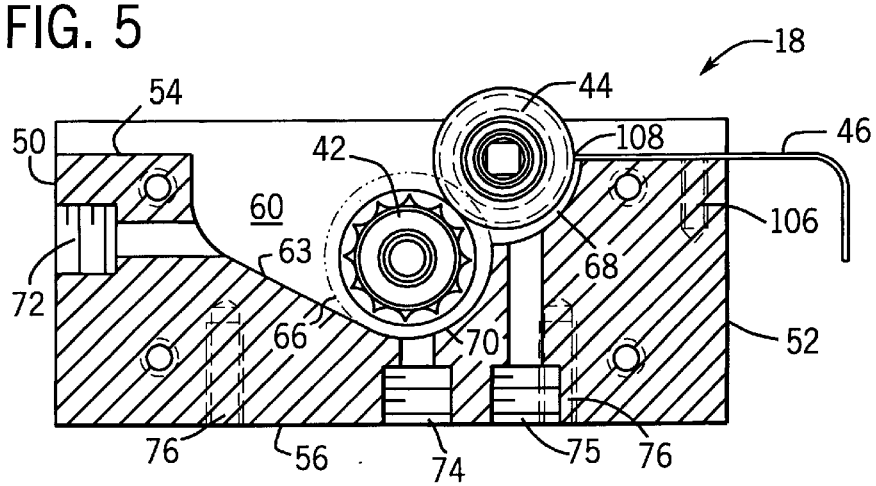
FIG. 5 is a cross sectional view of the coating mechanism of FIG. 4.
Figure 6:
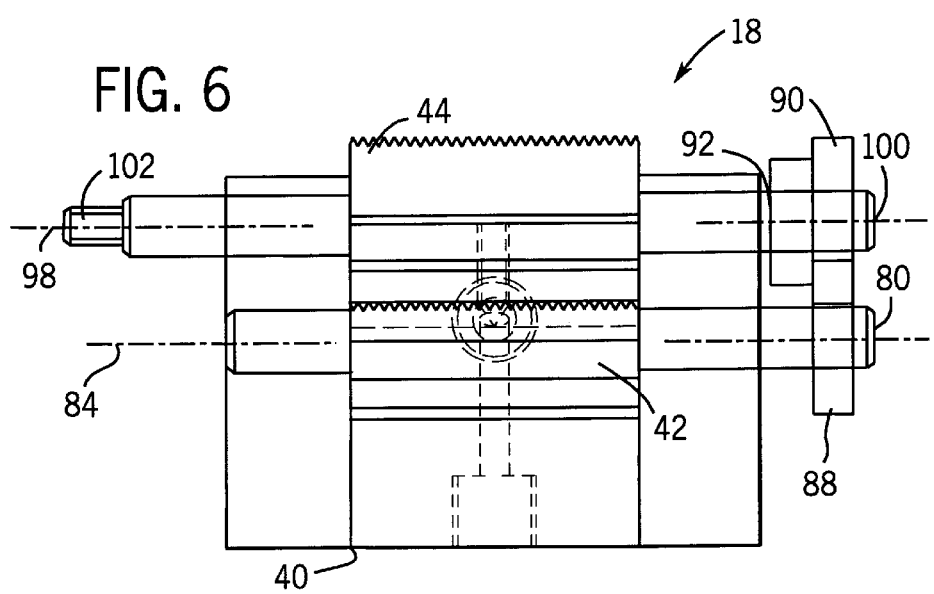
FIG. 6 is a front sectional view of the coating mechanism of FIG. 4.

As shown in FIGS. 4–6, the coating mechanism 18 has a base assembly 40, mixing rod 42, coating rod 44, and a doctor blade 46. The base assembly 40 has a base 48 that is a nonreactive material block with a front 50, a rear 52, a top 54, a bottom 56 and two sides 58. A cavity 60 formed in the block top 54 defines a bottom wall 63 of a reservoir. Opposing nonreactive material sidewalls 62 mounted to each side 58 of the base 48 by bolting or other means known in the art, define substantially straight reservoir sidewalls 64. The reservoir holds the electrochemically active coating material prior to coating.

The bottom wall 63 of the reservoir has a feed portion 66 and a coating portion 68. The feed portion 66 slopes inwardly and downwardly having a rounded bottom 70 to collect the coating for feeding into the rotating mixing rod 42. The curved coating portion 68 is disposed above and rearward of the feed portion 66 and accommodates the rotably mounted coating rod 44 that is fed coating material by the mixing rod 42.

A countersunk bore 72 in the base front 50 communicates with the feed portion 66 of the reservoir. The countersunk portion of the bore 72 is threaded to receive a fitting (not shown) on a coating material supply line. The supply line supplies the reservoir with coating material for use during the coating process.

Clean out holes, 74 and 75, in the base bottom 56 communicate with feed portion 66 and coating portion 68 of the reservoir, respectively, to facilitate cleaning the reservoir. The holes, 74 and 75, each have a threaded countersunk portion for receiving threaded plugs (not shown) to prevent the coating material from leaking out during the coating process. Four threaded mounting holes 76 in the base bottom 56 receive bolts to mount the coating mechanism 18 to a bracket (not shown) rigidly mounted to the apparatus base.

The mixing rod 42 is rotably mounted to the coating mechanism base sidewalls 62 and has a cylindrical drum 78 that feeds coating material to the coating rod 44 and is supported by an axially extending shaft 80. The drum 78 extends substantially the entire width of the reservoir in close proximity to the rounded bottom 70 of the reservoir feed portion 66.

Figure 7:
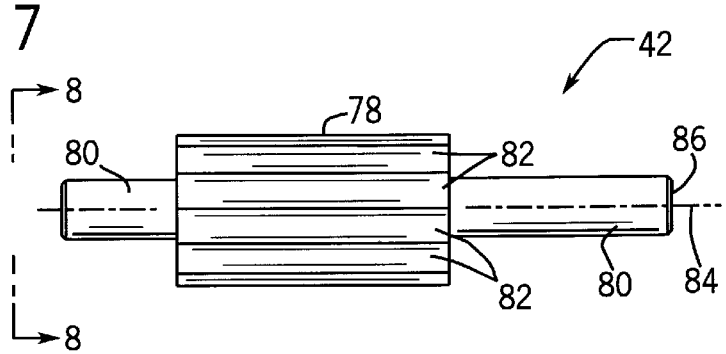
FIG. 7 is an elevational view of a mixing rod of FIG. 4.
Figure 8:
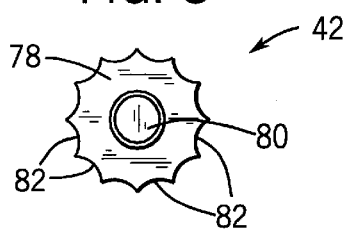
FIG. 8 is an end view of the mixing rod of FIG. 7.

As shown in FIGS. 7–8, the drum 78 outer surface has twelve axial grooves 82 forming scallops in the drum surface that agitate the coating material in the reservoir and scoops up the coating material, feeding it to the coating rod 44.

The mixing rod shaft 80 extends axially along a central axis of the mixing rod 42. Each end of the shaft 80 extends into one of the base assembly sidewalls 66 and is rotably mounted therein. One end 86 of the shaft 80 extends through the sidewall 66 and has a gear 88 mounted thereon for engaging an adjacent gear 90 mounted on a coating rod shaft 92.

Figure 9:
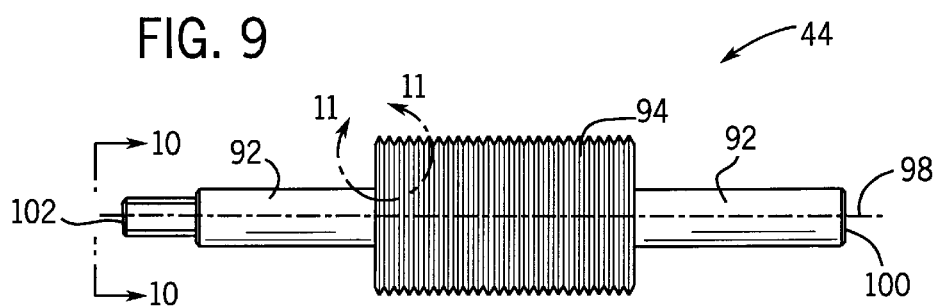
FIG. 9 is an elevational view of a coating rod of FIG. 4.
Figure 10:
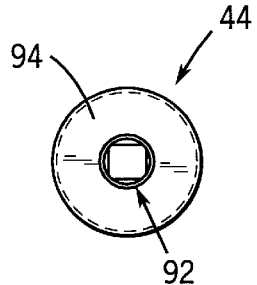
FIG. 10 is an end view of the coating rod of FIG. 9.
Figure 11:
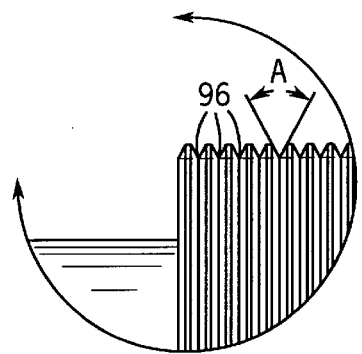
FIG. 11 is an exploded view of the coating rod drum of FIG. 9.

The coating rod 44, shown in FIGS. 9–11, is disposed above and rearward of the mixing rod 42 and receives coating material fed by the mixing rod 42. The coating material is upwardly applied by the rotating coating rod 44 to the downwardly facing side 32 of the lead foil 12 traveling overhead. Preferably, the foil direction of travel is opposing to the coating rod 44 rotation providing a smooth consistent coating thickness on the foil 12.

The coating rod 44 has a drum 94 that extends substantially the entire width of the reservoir and is supported by an axially extending shaft 92. The coating rod drum 94 applies the coating layer to the foil 12 substantially equal in width to the drum 94. The foil 12 is aligned by the web guide 16 with the respect to the coating rod drum 44 in order to leave at least one edge and a portion inward from the edge of the foil uncoated for attachment to electrical connectors. If the foil 12 is wider than the drum 94 both edges and portions inward from the edge of the foil can remain uncoated.

Referring to FIG. 11, the coating rod drum 94 has a plurality of circumferential grooves 96 on its outer surface. The circumferential grooves 96 carry the coating, fed by the mixing rod 42, to the downwardly facing foil surface providing a substantially consistent coating thickness. The grooves 96 are circumferential, as opposed to helical as found in a wire wound coating apparatus, to provide a sharp clean coating edge on the foil 12 that is inward of the foil edge.

Preferably, the grooves 96 are cut into the drum surface and substantially equally spaced along the drum length. The groove width, depth, and shape have an effect on the coating thickness applied to the foil. For example, equally spaced circumferential V-shaped grooves 96 cut into the drum surface approximately 0.040 inches apart having a depth of approximately 0.040 inches provide a coating thickness of approximately 0.005 for the coating material having a viscosity of approximately 2000–12000 cps. The V-shape of the grooves forms an angle A of 60 degrees.

The coating rod shaft 92 extends axially along a central axis 98 of the coating rod 44. Each end, 100 and 102, of the shaft 92 extends into one of the base assembly sidewalls 62 and is rotably mounted therein. One shaft end 100 extends through the sidewall 62 has a gear 90 mounted thereon for engaging the adjacent gear 88 mounted on the mixing rod shaft 80. The opposite coating rod shaft end 102 extends through the opposite coating mechanism base sidewall 62 and is adapted to mate with a drive motor (not shown) for rotably driving the coating rod shaft 92 and counter rotating feed rod shaft 80.

As shown in FIGS. 4–5, a doctor blade 46 adjustably mounted to the coating mechanism base top 54 with an edge 108 adjacent to the coating rod 44 prevents splattering and helps provide a consistent coating thickness. The blade 46 is nonreactive material having a pair of parallel slots 104 formed therein for slidable adjustable movement. The blade 46 is mounted by bolts (not shown) inserted through the slots 104. The bolts are received by threaded holes 106 in the base top 54.

The doctor blade edge 108 should be adjusted as close as possible toward the coating rod 44 without causing the material to build up on the blade 46. Preferably, the blade 46 is adjusted to define a gap of 0.002–0.004 inches between the blade edge 108 and the coating rod drum 44.

Referring back to FIG. 1, once the downwardly facing first side 32 of the foil 12 has been coated, the foil 12 travels along its path 30 toward the second web guide assembly 20. The second web guide assembly 20 is essentially identical to the first web guide assembly 16. The second web guide assembly 16 changes the foil strip 12 orientation by reversing the strip 12 direction of travel, thus the downwardly facing first foil side 32 having a freshly coated surface faces upwardly and the second foil side 36 faces downwardly, exposed to the second coating mechanism 22.

The second web guide 20 guides the foil 12 over the second coating mechanism 22 as described for the first web guide 16. The second coating mechanism 18 is substantially identical to the first coating mechanism 18. Tension in the foil 12 maintained by the web guides 16 and 20, idler rollers 28 and 38, and reels 14 and 26, eliminates the need for a backing roller at the first and second coating mechanisms 18 and 22 as the coating is applied.

The use of two independent coating mechanisms 18 and 22 advantageously allows application of the coating on the second side 36 of the foil 12 while the coating on the first side 32 is still wet, thus eliminating an intermediate drying step. Additionally, using two independent coating mechanisms 18 and 22, allows the user to apply a coating on the first side 32 of the foil 12 that is different from the coating applied to the second side 36 of the foil 12 for use in bi-polar batteries and the like.

The foil 12 having a moist coating on both sides is then passed through a drying apparatus 24 to reduce the moisture content in the coatings to approximately 7–8%. Preferably, the drying apparatus 24 consists of infra red heating elements (not shown) disposed above and below the foil path 30 that are directed at the coated foil 12 as it travels along the foil path 30. The infra red heating elements provide a consistent dry heat.

The dried coated foil 12 then engages an idler roller 38 prior to being wound up on the take up reel 26. The idler roller 38 in cooperation with the second web guide assembly 20 and take up reel 26 helps maintain the tension in the coated foil.

The coating apparatus components described above are controlled by a microprocessor control system (not shown) that coordinates the operation of each component during the coating process. Sensors (not shown) such as laser micrometers and moisture sensing equipment provide inputs to the microprocessor for processing to adjust foil travel speed, coating rod rotational speed, heating levels and the like, in order to meet set criteria.

Furthermore, stopping rotation of the coating rod, effectively stops the application of the coating material to the foil. Therefore, the control system allows the user to stop rotation of a coating mechanism coating rod in order to provide the entire width of a portion of the traveling foil without coating material.

Figure 12:
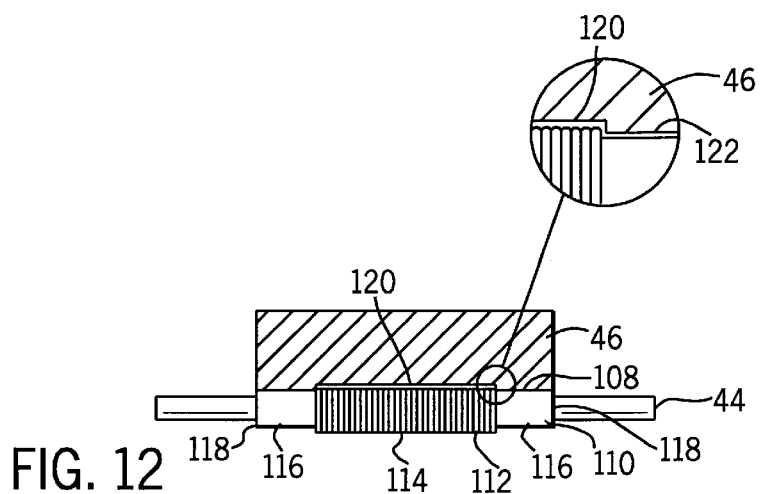
FIG. 12 is an alternative coating rod and doctor blade configuration for the apparatus of FIG. 1.

An alternative feed coating rod 44 and doctor blade 46 configuration shown in FIG. 12, is a coating rod 44 with a drum 110 having circumferential grooves 112 formed on a central portion 114 of the drum surface and two nongrooved portions 116 axially extending from the central portion 114 to the drum ends 118. The grooved central portion 114 has an outside drum diameter larger than the nongrooved portions 116 creating a diameter differential between the grooved and nongrooved portions, 114 and 116.

A doctor blade 46 has an edge 108 with a notched central portion 120 to receive the grooved central portion 114 of the coating rod drum 110. The notched portion 120 length is slightly larger than the length of the grooved portion 114 on the drum 110 and the depth is slightly larger than the diameter differential of the two drum portions 114 and 116, allowing the nonnotched portion 122 of the doctor blade 46 to be set closer to the nongrooved portion 116 of the coating drum 110 than the grooved portion 116.

The notched doctor blade in combination with a partially grooved coating rod drum allows precise doctoring of the coating edge on the foil strip. The portion of the doctor blade adjacent to the grooved portion of the drum provides a smooth consistent thickness coating as described in the first embodiment. The nonnotched portion of the doctor blade cleanly defines the coating edge at the edge of the grooved section of the coating rod and prevents the deposition of excess material on the foil edge that is to remain uncoated.

While there has been shown and described what are at present considered the preferred embodiment of the invention, it will be obvious to those skilled in the art that various changes and modifications can be made therein without departing from the scope of the invention.

I claim:

1. A coating mechanism for coating one side of a moving unsupported strip with coating material, said coating mechanism comprising:
   a base having a front and a rear;
   a reservoir formed in said base, and having a bottom wall and an open top;
   a mixing rod rotably mounted in said reservoir toward said bottom wall of said reservoir;
   a coating rod rotably mounted in said reservoir adjacent and above said mixing rod, and having a portion extending above said reservoir top, wherein said mixing rod mixes coating material disposed in said reservoir and feeds the coating material to said coating rod, and said coating rod rotates in a direction opposed to the direction of travel of the unsupported strip to transfer the coating material to the unsupported strip passing above said coating rod; and
   a doctor blade mounted adjacent to said coating rod.

2. A coating mechanism as claimed in claim 1, wherein said reservoir has a feed portion and a coating portion, said mixing rod being disposed in said feed portion and said coating portion accommodating said coating rod.

3. A coating mechanism as in claim 1, wherein said base has a supply line supplying coating material to said reservoir.

4. A coating mechanism as in claim 1, wherein said base has at least one clean out hole in communication with said reservoir.

5. A coating mechanism as in claim 1, wherein said mixing rod has a drum extending substantially the entire width of said reservoir.

6. A coating mechanism as in claim 5, wherein said drum has axial grooves formed thereon for agitating said coating material in said reservoir.

7. A coating mechanism as in claim 1, wherein said coating rod has a drum extending substantially the entire width of said reservoir.

8. A coating mechanism as in claim 7, wherein said drum has circumferential grooves forming a grooved portion thereon for conveying said coating material to said strip.

9. A coating mechanism as in claim 8, wherein said grooves are v-shaped.

10. A coating mechanism as in claim 8, wherein said grooved portion has at least one adjacent nongrooved portion.

11. A coating mechanism as in claim 10, wherein said grooved portion has an outside drum diameter greater than said nongrooved portion.

12. A coating mechanism as in claim 1, wherein said mixing rod and said coating rod counter rotate.

13. A coating mechanism as in claim 1, wherein said doctor blade is adjustably mounted to said base.

14. A coating mechanism as in claim 1, wherein said doctor blade defines a gap between an edge of said doctor blade and said coating rod.

15. A coating mechanism as in claim 14, wherein said gap is approximately 0.003 inches.

16. A coating mechanism as in claim 1, wherein said doctor blade is notched.

17. A coating mechanism as in claim 1, wherein said base is formed from a material nonreactive with said coating material.

18. A coating mechanism as in claim 1, wherein said mixing rod is formed from a material nonreactive with said coating material.

19. A coating mechanism as in claim 1, wherein said coating rod is formed from a material nonreactive with said coating material.

20. A coating mechanism as in claim 1, wherein said doctor blade is formed from a coating material nonreactive with said coating material.

21. A coating apparatus as in claim 1, wherein said strip is a metal.

22. A coating apparatus as in claim 21, wherein said metal is an ultra-thin foil.

23. A coating apparatus as in claim 22, wherein said ultra-thin foil is approximately 2 to 5 mils thick.

* * * * *